United States Patent [19]

Mak et al.

[11] Patent Number: 5,262,755
[45] Date of Patent: Nov. 16, 1993

[54] INBOUND COMMUNICATIONS USING ELECTRICITY DISTRIBUTION NETWORK

[75] Inventors: Sioe T. Mak, Chesterfield; Kevin J. Franzen, Florissant, both of Mo.

[73] Assignee: Distribution Control Systems, Inc., Hazelwood, Mo.

[21] Appl. No.: 809,588

[22] Filed: Dec. 17, 1991

[51] Int. Cl.[5] .................. H04B 3/00; H04L 27/00
[52] U.S. Cl. ................... 340/310 R; 340/310 A; 375/37
[58] Field of Search ........ 340/310 R, 310 A, 310 CP; 375/36, 37; 455/3.1, 3.3

[56] References Cited

U.S. PATENT DOCUMENTS

| | | | |
|---|---|---|---|
| 4,106,007 | 8/1978 | Johnston et al. | 340/310 R |
| 4,218,655 | 8/1980 | Johnston et al. | 340/310 R |
| 4,963,853 | 10/1990 | Mak | 340/310 R |
| 4,988,972 | 1/1991 | Takagi | 340/310 R |
| 4,996,513 | 2/1991 | Mak et al. | 340/310 R |

Primary Examiner—Donnie L. Crosland
Attorney, Agent, or Firm—Polster, Lieder, Woodruff & Lucchesi

[57] ABSTRACT

Signals carried inbound on an electricity distribution network are detected by extracting electrical current information from a waveform of the electricity distribution network, and digitally filtering the electrical current information, thereby forming a digital waveform, to extract signal information contained in the electrical current information. A reference waveform is constructed from a portion of the digital waveform, and the signal information is detected by comparing portions of the digital waveform with corresponding portions of the reference waveform.

37 Claims, 5 Drawing Sheets

INBOUND COMMUNICATIONS USING ELECTRICITY DISTRIBUTION NETWORK

BACKGROUND OF THE INVENTION

This invention relates to a system and method for extracting information from a carrier wave and relates generally to the method and apparatus described in U.S. Pat. Nos. 4,106,007 and 4,218,655, the disclosures of Which are incorporated herein by reference. As described in those patents, it is known that a modulation signal can be superimposed on a power system waveform, at specified locations on the power system waveform such as a zero crossing, to cause wave shape perturbations in the carrier wave. The embodiment described herein uses electric load pulses which are superimposed on the 60 Hz load current of an electrical power distribution system.

Communication over electric power distribution lines is useful for signaling, meter reading, and load control, among other uses. However, communication over an electric distribution system is a complex undertaking. Each customer service constitutes a branch in the distribution feeder, and the branching is so extensive that it is impractical to provide filter and by-pass circuitry at each branch point. The distribution system is not an attractive medium for conventional communications due to the attenuation and dispersion of the signals and because noise levels tend to be high. To overcome the high noise levels, it is generally necessary to use narrow band filtering, error-detecting and error-correcting codes, and relatively high signal power levels at low bit rates.

The aforementioned problems arise in two areas. The first concerns transmitting information from the central source in the direction of energy flow to the individual customer premises. This transmission of information in the direction of energy flow is referred to as "outbound" signaling. Functions such as automatic meter reading and various alarm systems, however, require that information pass not only from a single source to the end user, but also from the end user back to the central station. This transmission of information in the direction opposite to that of the energy flow is referred to as "inbound" signaling In the system described in the aforementioned patents, each binary digit (a binary "1" or a binary "0") is made up of four current pulse modulations located at preselected zero crossings of the electrical distribution network voltage waveform. These current pulses are located within eight zero crossings (four complete cycles) of the waveform and the current pulse patterns for "1s" and "0s" are complementary.

By using different pulse patterns to define binary "1s" and "0s," it is possible to define a number of separate, non-interfering channels over which information can be transmitted in each eight half-cycle segment of the waveform. Such channel pulse patterns are explained in U.S. Pat. No. 4,963,853, the disclosure of which is incorporated herein by reference.

Presently available communications systems of this type are generally satisfactory, but they could be improved. For example, noise on the electricity distribution network can significantly reduce the performance of the communications system. The signal wave itself can change its wave shape and frequency spectrum, depending upon conditions on the network. When a message is received which is in error, it is not always possible to identify which bit or bits of the message are incorrect. Moreover, present systems do not generally provide equivalent performance on all non-interfering channels. And these systems suffer reduced performance at higher 60 Hz background currents.

SUMMARY OF THE INVENTION

One of the objects of this invention is to provide a method for improving the transmission of inbound information in an electric distribution system.

Another object of this invention is to provide a method which reduces the effect of noise on system performance.

Another object is to provide a method for more readily determining signal wave shape for each incoming message.

A fourth object is to provide a method for improving the identification and correction of incorrect bits in a message.

A fifth object is to provide improved performance so that performance on all non-interfering channels is more satisfactory.

A sixth object is to provide a method for improving system performance at higher 60 Hz background currents, to allow signal detection at the distribution substation bus.

Other objects and features of this invention will be in part apparent and in part pointed out hereafter.

Briefly, in the method of the present invention, signals carried inbound on an electricity distribution network are detected by extracting electrical current information from a waveform of the electricity distribution network, and digitally filtering the electrical current information, thereby forming a digital waveform, to extract signal information contained in the electrical current information. A reference waveform is constructed from a portion of the digital waveform, and the signal information is detected by comparing portions of the digital waveform with corresponding portions of the reference waveform.

DESCRIPTION OF THE PREFERRED EMBODIMENT

The present invention is specifically for use with communications systems using the already existing electric distribution system connected to each premises to provide the carrier. Signalling using these types of communications systems is done by drawing current pulses near the zero crossings of the voltage of the 60 Hz system voltage. In the system described herein, it is further required that binary digit or bit "1" or bit "0" consists of a combination of number of current pulses within a fixed number of cycles of 60 Hz, typically four pulses within four cycles.

Figure 1:
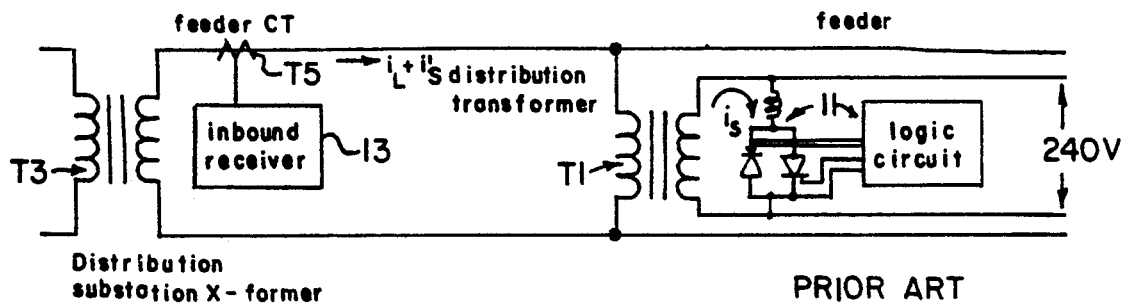
FIG. 1 is an electrical schematic of a communication system of the type which can use the method of the present invention.

More specifically, the present method is used with a communications system which uses electric load pulses which are superimposed on the 60 Hz load current and extracted at the substation. These pulses are generated at the remote locations on the feeder at the service voltage levels. Channel pulse patterns for bit encoding are covered in the U.S. Pat. No. 4,963,853. FIG. 1 shows a typical circuit diagram illustrating such a system. The input signals are generated by a transmitter/transponder 11 which generates the signal pulses $i_s$ shown in the right side portion of FIG. 1.

Figure 1A:
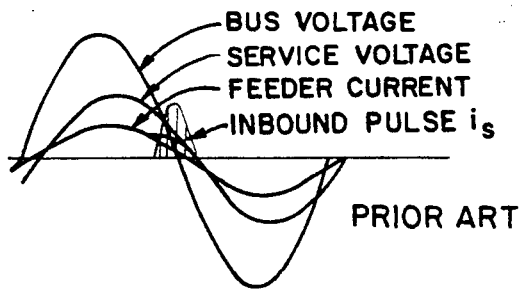
FIG. 1A is a graphical representation of a portion of the waveforms involved in the communication system of FIG. 1.

These signal pulses pass inbound through various transformers, such as a distribution transformer T1 (which transformers the signal pulse $i_s$ to a pulse $i_{s'}$), and a distribution substation transformer T3 shown. The signal at the distribution substation transformer is extracted by a current transformer T5 connected to an inbound receiver 13. As shown, at the current transformer the bus current includes not only signal pulse $i_{s'}$, but also the load current $i_L$. Some of the waveforms involved are illustrated in FIG. 1A.

Existing inbound receivers like receiver 13, although adequate based on present field experiences, have some shortcomings.

Figure 2:
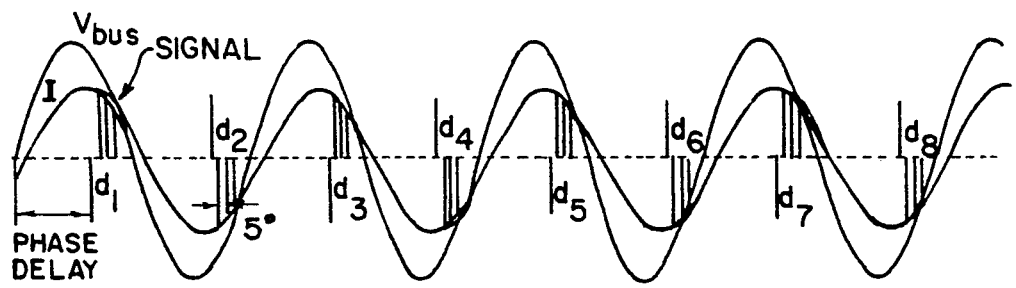
FIG. 2 is a graphical representation illustrating signal extraction in the system of FIG. 1.

FIG. 2 shows how the data heretofore was obtained for signal extraction and detection at the feeder or bus current transformer T5. If the appropriate phase delay for each half cycle is reached, then for each detection window the current is sampled every five (5) electrical degrees. Assume in FIG. 2 the background current has bit "1" of the channel 15 pattern superimposed on it. If the background current is slightly unstable and not quite symmetrical, then the sampled data can be expressed as a stable component $i_1$, for the positive polarity and $i_2$ for the negative polarity plus a variable component "$a_j$" and signal "$s$" at the appropriate locations. For each window of the eight half cycles, the j-th sampled data can be expressed as follows:

$$d_1 = i_1 + a_1 + s$$
$$d_2 = -i_2 - a_2$$
$$d_3 = i_1 + a_3$$
$$d_4 = -i_2 - a_4 - s$$
$$d_5 = i_1 + a_5$$
$$d_6 = -i_2 - a_6 - s$$
$$d_7 = i_1 + a_7 + s$$
$$d_8 = -i_2 - a_8$$

If the detection matrix $D_{15} = [1, 1, -1, -1, -1, -1, 1, 1,]$ is applied to the sampled data matrix then $$S_{15} = [1, 1, -1, -1, -1, -1, 1, 1] \begin{bmatrix} i_1 + a_1 + s \\ -i_2 - a_2 \\ i_1 + a_3 \\ -i_2 - a_4 - s \\ i_1 + a_5 \\ -i_2 - a_6 - s \\ i_1 + a_7 + s \\ -i_2 - a_8 \end{bmatrix} =$$

$$4s + a_1 - a_2 - a_3 + a_4 - a_5 + a_6 + a_7 - a_8$$

The noise portion $A_{15} = [a_1 - a_2 - a_3 + a_4 - a_5 + a_6 + a_7 - a_8]$ can be a positive or negative number. If $A_{15}$ is greater than $4s$ and $A_{15}$ is negative, then $S_{15}$ becomes a negative number. The detected bit is in error.

If other channels bit patterns are present, part of the elements of the sampled data matrix $i_1 + a_1$, $-i_2 - a$, $i_1 + a_3$,..., $i_1 + a_{7'}$, $-i_2 - a_8$ remains the same but the noise portion of the extracted signal is different for each channel. The noise portion of channel 1 is $A_1 = [a_1 + a_2 + a_3 + a_4 - a_5 - a_6 - a_7 - a_8]$.

To improve the receiver sensitivity, a precancellation technique has heretofore been used, but it has no effect on the noise portion.

In the original version of the detector 13, sampled data for the first seven (7) bits were gathered and the median determined. This median and its location in the window were assumed to be the location of the peak of the inbound signal. For each channel this median location was determined.

From that point on in the prior decoding process, only the sampled data at the median location of the window was used. If the value of the detected bit was positive, the bit was assumed to be "ONE" and if the value was negative the bit was "ZERO". In a later enhanced form, if the decoded message did not pass error detection and correction, the other sampled data before or after median were used for decoding.

Some of the difficulties encountered with this method were:

i. If the phase delay was set incorrectly the median may have been at the end or beginning of the window. The inbound signal uses the local voltage reference to determine its firing angle. But this voltage could be phase shifted by a substantial amount from the bus voltage at the substation which is used for reference by the inbound receiver. The transient oscillatory frequency of the inbound signal changes with system load. Hence it was difficult to determine a good phase delay that applied to all kinds of loading conditions.

ii. Nothing was done about the channel noise and specific preferred channels, due to the unique structure of their detection algorithms, tended to have better performance than the other channels.

The method of the present invention overcomes those difficulties by causing the receiver to adapt to changes in phase delay for each channel under all possible circumstances. Hence one coarse setting of the phase delay is adequate and the receiver 13 tracks the changes and adjusts itself to the new conditions. It filters out as much noise as possible. It uses as much as possible of the signal energy for signal detection. It includes a technique to spot bad bits such that when the decoded message does not pass the error detection criteria, the bad bits can be changed to pass the error detection criteria (a so-called "ERASURE FILLING" technique).

Field investigations have shown that inbound pulses received at the substation have peaks that ranges between 0.65 Amp. and 2.6 Amp. and are transient oscillatory in nature with frequencies that range between 200 Hz and 400 Hz. The most severe type of noise for this type of inbound communication is the sudden switching of a large load. Such a switching current exhibits itself as a 60 Hz current superimposed on a decaying dc transient and transient oscillatory component. The background current at the bus on which the inbound pulse is superimposed ranges from 100 Amp to 5000 Amp RMS.

Given all these factors, the method of the present invention was designed to preferably have the following features:

i. Digitize the current using an at least 15 bit analog-to-digital converter.

ii. Apply a digital infinite impulse response (IIR) or finite impulse response (FIR) band-pass filter having a pass band between 200 Hz to 450 Hz.

iii. Determine a median waveform of the filtered signal from the first "n" bits of the message. Edge truncation of the signals may or may not be necessary. Assume a fixed phase delay and a window width of 180 degrees. The median waveform and its location within the window is then well known. This median waveform is henceforth called the reference waveform.

Criterion for signal strength is then defined or developed from information obtained in iii. In addition signal detection and criterion for bad bits are defined. Finally, an erasure filling technique is implemented.

Such a system using this method has been implemented as follows:

The inbound digital filter

The band-pass filter used was a 4-pole Butterworth 3 dB down IIR filter with band-edge frequencies of 200 Hz and 400 Hz. The sampling rate is 4320 Hz. The transfer function for this filter was:

$$H(z) = \frac{W0 + W1^*z^{-1} + W2^*z^{-2} + W3^*z^{-3} + W4^*z^{-4}}{1 + Y1^*z^{-1} + Y2^*z^{-2} + Y3^*z^{-3} + Y4^*z^{-4}}$$

where

| | |
|---|---|
| $W0 = 2.612144E-02$ | $W1 = 0$ |
| $W2 = -5.224288E-02$ | $W3 = 0.$ |
| $W4 = 2.612144E-02$ | $Y1 = -3.166294$ |
| $Y2 = 4.03314$ | $Y3 = -2.43781$ |
| $Y4 = .5981039$ | |

Actual application of the filter on real currents containing inbound signals with all channels 1, 6, 9, 12, 14 and 15 active are shown in subsequent Figs.

Figure 3:
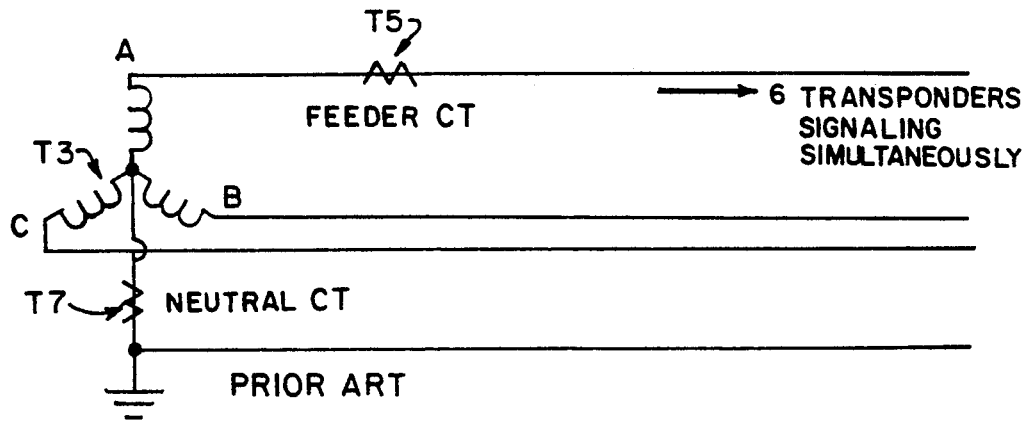
FIG. 3 is an electrical schematic of an electricity distribution network on which the method of the present invention was tested.

FIG. 3 is an electrical schematic of the distribution network to which the current method was applied. In addition to those transformers shown in FIG. 1, it includes a current transformer T7 connected in the substation neutral wire of the substation distribution transformer. The currents were sampled at the locations indicated by the current transformers T5 and T7.

Figure 4:
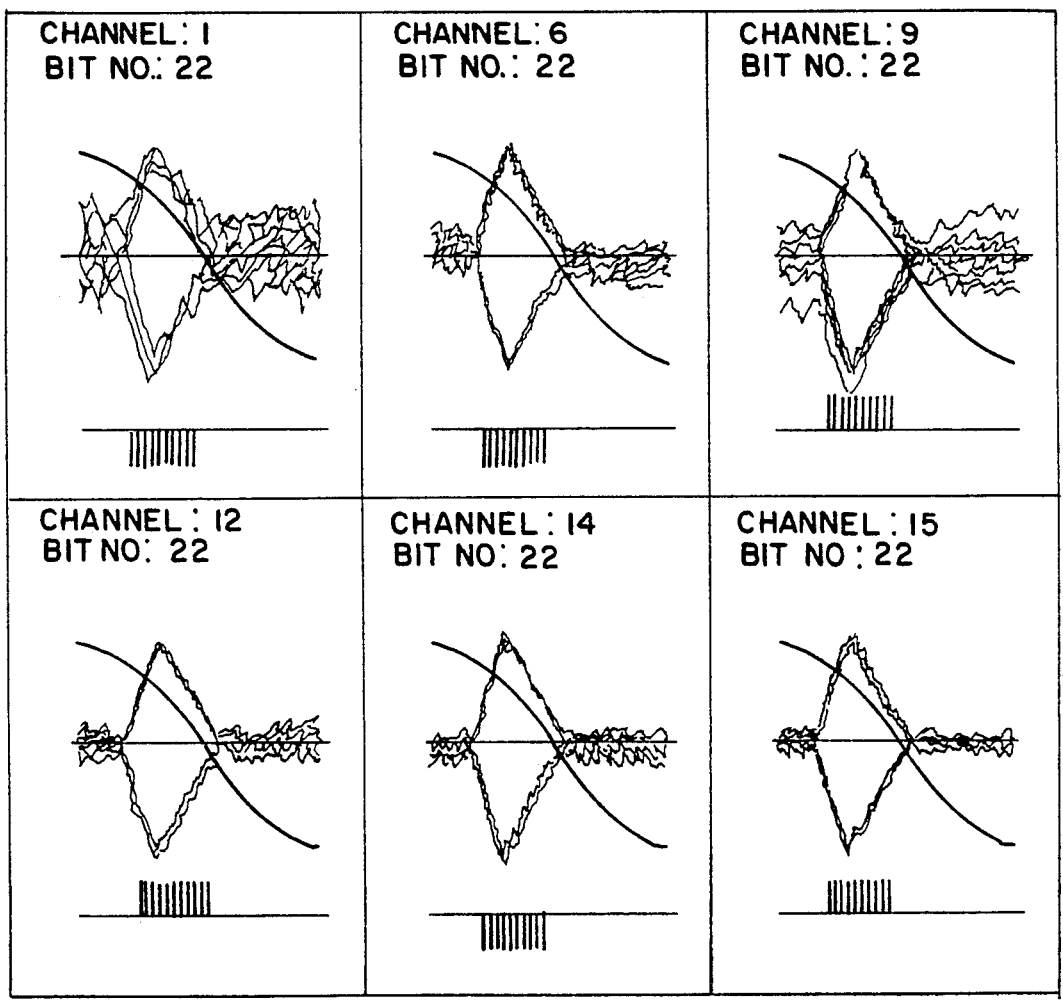
FIG. 4 is a graphical representation of signal extraction from the system of FIG. 3 using the feeder current transformer to extract the signal information, without using the method of the present invention.

FIG. 4 shows plots of 22 bits superimposed on top of each other for all six channels as extracted by current transformer T5. Parts of a cycle of the background current is also shown and the extracted inbound signals are amplified before plotting. The messages contain mixes of bit "ONE" and bit "ZERO".

Figure 5:
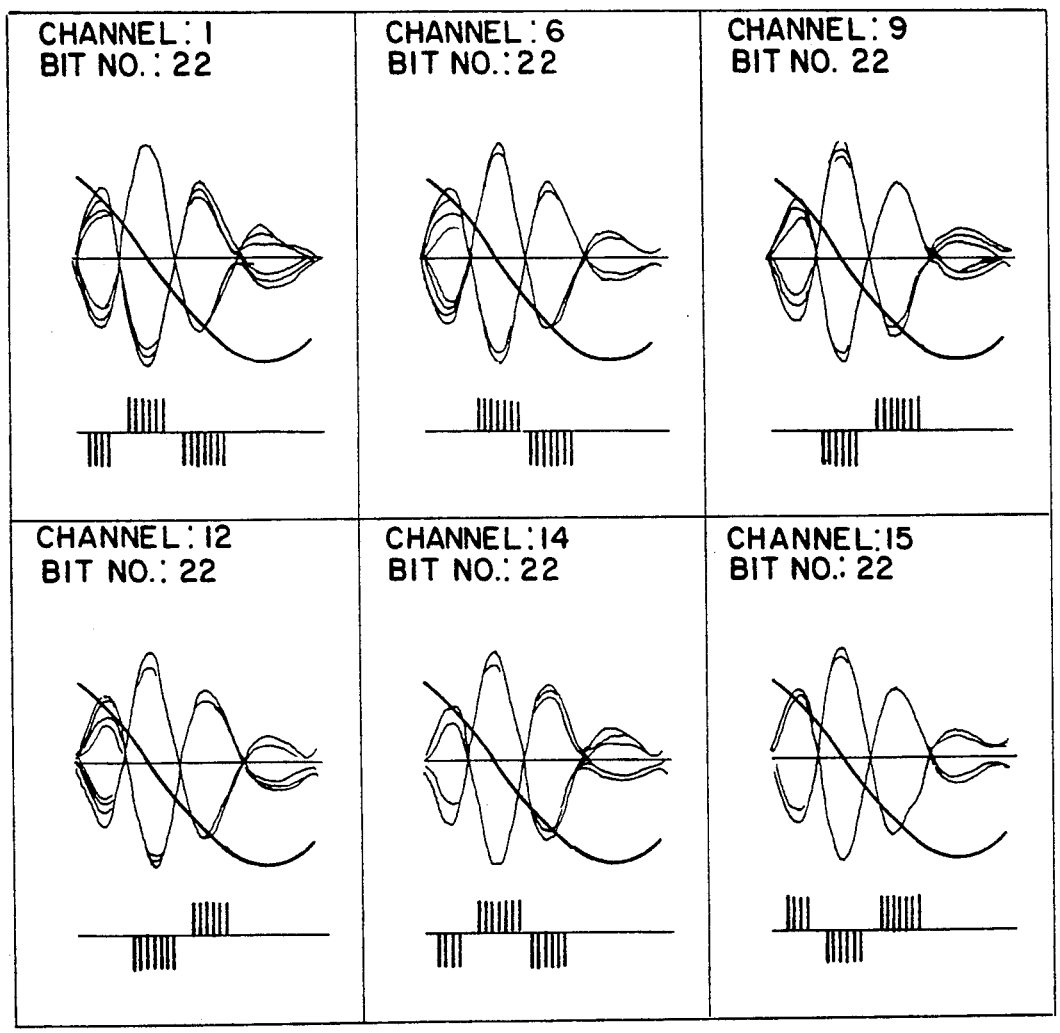
FIG. 5 is a graphical representation of the signal data of FIG. 4, after applying the digital filtering of the method of the present invention.

FIG. 5 shows plots of the digitally filtered data of the same bits shown in FIG. 4. The filtered signals are oscillatory and are phase shifted with respect to the background current. The system current was practically noise free and no gain was obtained by filtering.

Figure 6:
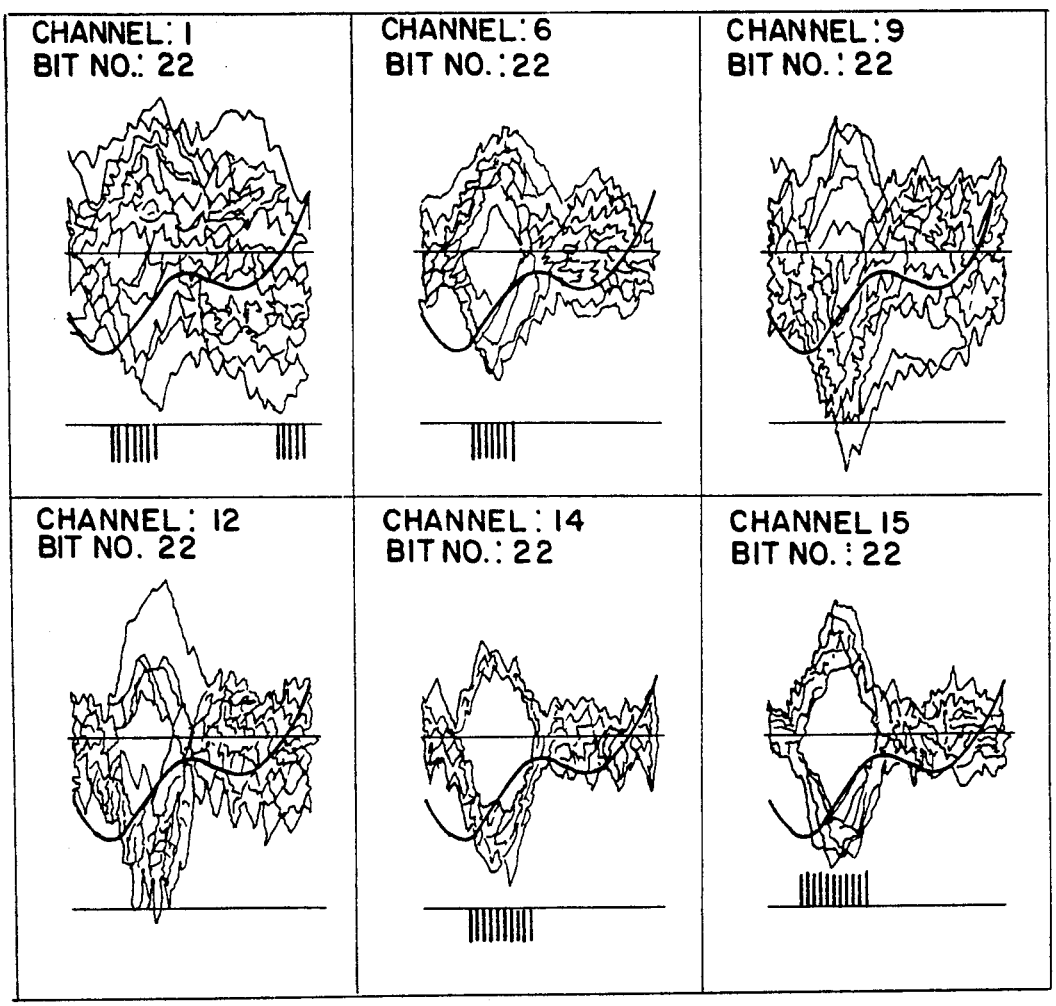
FIG. 6 is a graphical representation similar to FIG. 4, but illustrating signals extracted in the substation neutral wire at the substation.

The same messages were sent again but the signals were extracted in the substation neutral wire at the substation. The neutral current contained 3-rd, 5-th, 7-th and 9-th harmonics. The results of signal extraction are shown in FIG. 6. Only channels 14 and 15 seem to look reasonable and channels 12 and 9 look fair.

Figure 7:
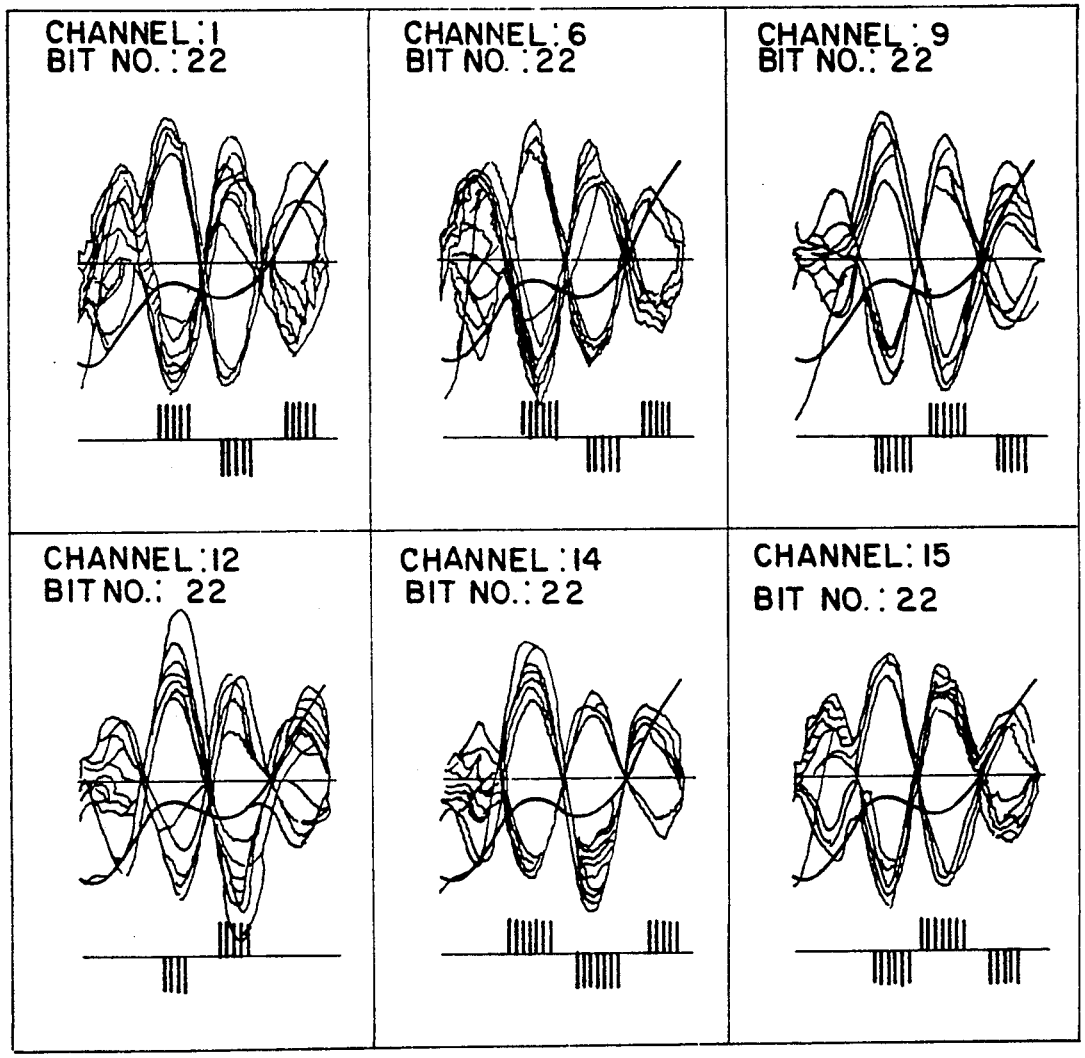
FIG. 7 is a graphical representation of the signal data of FIG. 6, after applying the digital filtering of the method of the present invention.

The results by application of the digital filter are shown in FIG. 7. The filtered signals look more consistent and very much less affected by noise. In the actual implementation it does not matter whether an IIR or FIR is used. Both IIR and FIR filters introduce a phase delay that has to be accounted for in deciding how large a detection window to use.

Signal averaging process for reference pattern determination

The reference pattern is defined as the average pattern of the first "n" bits of every message for each channel. Hence the reference pattern is unique to the channel being decoded. By apply the detection algorithm of a certain channel first on the filtered data, the signals defining the bit for that channel are extracted.

For a window width of 180 electrical degrees and a sampling interval of five (5) electrical degrees of the 60 Hz beyond the fixed phase delay, for the first "n" bits of the message on a channel the following sampled data are obtained and stored:

| $s_{11}$ | $s_{12}$ | $s_{13}$ | ... | $s_{1,36}$ |
|---|---|---|---|---|
| $s_{21}$ | $s_{22}$ | $s_{23}$ | ... | $s_{2,36}$ |
| ... | ... | ... | ... | |
| $s_{n-1,1}$ | $s_{n-1,2}$ | $s_{n-1,3}$ | ... | $s_{n-1,36}$ |
| $s_{n,1}$ | $s_{n,2}$ | $s_{n,3}$ | ... | $s_{n,36}$ |

Since after filtering the signal is oscillatory, any of such series $s_{j1}, s_{j2}, ... s_{j35}, s_{j36}$ can have positive or negative values.

If the first "n" bits for pattern determination are all "1" or "0", then the averaging process is straightforward. However, there is always a mix of bit "1" and "0". The method of the present invention uses the following process:

i. Assume the first bit to be the initial reference bit. Hence $s_{11}, s_{12},..., s_{36}$ define the reference pattern.

ii. The first refinement of the reference pattern is by taking the average of the first and second patterns. Since the two bits can be different, we compute the following numbers:

$$s'_{r.1} = s_{11} + s_{21} \quad s''_{r.1} = s_{11} - s_{21}$$
$$s'_{r.2} = s_{12} + s_{22} \quad s''_{r.2} = s_{12} - s_{22}$$
$$\ldots \quad \ldots$$
$$s'_{r.36} = s_{1.36} + s_{2.36} \quad s''_{r.36} = s_{1.36} - s_{2.36}$$

Then form the sums $$S'_r = \sum_{k=1}^{36} = |s'_{rk}| \text{ and } s''_r = \sum_{k=1}^{36} |s''_{rk}|$$

If $S'_r$ greater than $S''_r$, then $s'_{r.1}, s'_{r.2} \ldots s'_{r.36}$ is the new reference pattern.

If $S'_r$ is less than $S''_r$ then $s''_{r.1}, s''_{r.2} \ldots S''_{r.36}$ is the new reference pattern.

iii. The next refinement is obtain by repeating the process as described in step ii. to the previously refined reference pattern and the pattern of third bit. The process is repeated until all "n" patterns are used.

iiii. The final reference pattern is obtained by dividing each member of the pattern by "n" to normalize the reference pattern.

iiiii. The final pattern for the channel can be described by the following vector expression:

$$[s_{rf}] = [s_{rf.1}, s_{rf.2}, \ldots, s_{rf.35}, s_{rf.36}]$$

This pattern can be arbitrarily defined to represent bit "1" or bit "0".

Bit detection and message decoding

The detection of k-th bit is performed as follows:

i. The reference vector is added and subtracted from the k-th bit pattern to form two new patterns as shown below.

$$s'_{k1} = s_{rf.1} + s_{k1} \quad s''_{k1} = s_{rf.1} - s_{k1}$$
$$s'_{k2} = s_{rf.2} + s_{k2} \quad s''_{k2} = s_{rf.2} - s_{k2}$$
$$\ldots \quad \ldots$$
$$s'_{k36} = s_{rf.36} + s_{k36} \quad s''_{k36} = s_{rf.36} - s_{k36}$$

ii. The following summations are performed.

$$S'_k = \sum_{m=1}^{36} |s'_{km}| \text{ and } S''_k = \sum_{m=1}^{36} |s''_{km}|$$

If $S'_k$ is greater than $S''_k$, then the k-th bit is bit "1" and the value $S'_k$ is stored.

If $S'_k$ is less than $S''_k$, then the k-th bit is bit "0" and the value $S''_k$ is stored. The stored value of $S'$ or $S''$ is the signal strength of the k-th bit.

iii. This process is used to detect all "N" bits of the inbound message including the first "n" bits that are used to determine the reference pattern. The result of the decoding may result in an inverted bit pattern. If this happens then an inversion algorithm is applied by changing all bit "1"s into "0"s and vice versa.

Erasure Filling

The erasure filling technique of the present invention can only be used if a capability is provided to detect bad bits in a message and a criterion exists to determine whether a message is correct or not.

The "message correctness" criterion used is that the message has to pass the CRC-16 error detection algorithm. If a message does not pass the CRC-16 error detection algorithm, then the message is assumed to contain one or more contaminated bits.

In order to understand the meaning of contaminated or "bad" bit, assume that the i-th member of the reference vector is equal to +10.0. The reference vector is also assumed to be statistically a good representative of the actual signal. This is especially true if "n" is made large enough. The k-th bit that has to be decoded shows a strength of $-2.0$ for its i-th member. Following the procedure outlined above for bit detection and message decoding:

$$s'_{k.1} = 10.0 + (-2.0) = 8.0$$

$$s''_{k.1} = 10.0 - (-2.0) = 12.0$$

If the vector consists of only one member, then this bit will be decoded as bit "0" since $S''_k$ is greater than $S'_k$ with a signal strength of 12.0.

This result may not be correct. The possible cases are:

i. The true signal is 10.0, but a noise hit of $-12.0$ is superimposed to give a net result of $[10.0 - 12.0] = -2.0$ ii. The true signal is $-10.0$ but a noise hit of $+8.0$ is superimposed to give a net result of $[-10.0 + 8.0] = -2.0$ If there is no noise contamination and the true bit has a strength of $-10.0$ for its pattern member, then:

$$s'_{k.1} = 10.0 + (-10.0) = 0.$$

$$s_{k.1} = 10.0 - (-10.0) = 20.0$$

and the bit would have been decoded as bit "0" because $S''_k$ is greater than $S'_k$.

If there is no noise contamination and the true bit has a strength of $+10.0$ for its pattern member, then:

$$s'_{k.1} = 10.0 + (+10.0) = 20.0$$

$$s''_{k.1} = 10.0 - (+10.0) = 0.0$$

and the bit would have been decoded as bit "1" because $S'_k$ is greater than $S''_k$.

If the noise is additive with respect to the signal or in other words the noise has the same polarity as the signal, then the bit is always decoded correctly. However $s'_{k.1}$ or $s''_{k.1}$ will be much larger than 20 in the numerical examples used above.

If the noise is small then all the bits should have signal strengths of $[20.0 + d_j]$ where $d_j$ is small with respect to 20.0.

Hence, if a series of "N" bits belonging to an inbound message does not pass CRC-16, the likelihood that a particular bit is decoded incorrectly will be the one that has the lowest signal strength in the series. The algorithm to apply is:

i. If the message does not pass the CRC-6 error detection algorithm, determine the bit which has the lowest signal strength.

ii. If the bit was decoded as bit "0", change it into bit "1". If the bit was decoded as bit "1", change it into bit "0".

iii. If it still does not pass the error detection algorithm, locate the bits that have the lowest and the next lower signal strengths. There are now three (3) possible combinations to be tried. As an example if the initially assumed combination of bad bits is "01", then the possible replacement combinations are "00", "11" and "10". Each combination is tried until the combination is used that causes the message to pass the CRC-16 error detection algorithm. In general, if there are "j" bits to be corrected, the number of combinations to try is $[j^2-1]$. At this moment it is preferred to limit the number "j" to four (4) only. There is a number where the probability to pass CRC-16 increases to an unacceptable level even though the message is in error.

There is no guarantee that the first "n" bits are the best bits to use to determine the reference vector. The technique that could be used is to determine the average strength of "n" signals and exclude the ones that are larger than certain standard deviations away from the average to determine a new average using less than "n" bits. An alternate technique is to use bits (n+1), (n+2), .........., (2n−2), (2n−1) (2n) to determine a second reference vector. This technique is more desirable since field experience shows that the nature of noise in inbound communication is primarily burst type noise extending to a few consecutive bits. Hence if "n" is small, the effect of averaging causes the good bits to be excluded instead of the other way around. Both reference vectors are used for decoding with this alternative method and erasure filling is applied to each result. By way of example, the number "n" is seven and the number for erasure filling is four (4) bits.

The method of the present invention has been tested for real time operation at a substation that is notorious for its poor inbound performance using the existing inbound receiver. The communication performance on six (6) channels from 208V and 240V class remote transponders typically ranges between 37% to 74.5%. Using the method of the present invention typically improved the performance to range between 74% to 94%. This is a very dramatic improvement. Where at most locations receivers typically have performance levels using four (4) channels in the 95% to 98% range, with the new pattern recognition receiver the six (6) channels.

The pattern recognition receiver enhances inbound communication for all six (6) channels substantially as compared to the existing inbound receiver. The enhancement provides additional benefits that are absent in the existing receiver, such as:

i. Fine tuning of the phase delay based on load conditions is not necessary.
ii. More reliable application of six (6) channels.
iii. Larger immunity to known inbound type noise.
iiii. Reduce the extra overhead due to error correction requirements. It also reduces the need to use multi-bit operation and the automatic retry feature and thereby decreases the communication time to transmit information.
iiiii. Increase the capability to operate in an environment where the inbound signal strength is reduced due to circuit configuration, such as 208V transponders beyond a Y—Y connected step-down transformer, or metro area networks where all feeders from the same bus are connected to a common network at the service voltage side.

In view of the above, it will be seen that the various objects and features of this invention are achieved and other advantageous results obtained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of detecting signals carried inbound on an electricity distribution network, comprising the steps of:
    extracting electrical current information from a waveform of the electricity distribution network;
    digitally thereby forming a digital waveform, to extract signal information contained in said electrical current information;
    constructing a reference waveform from a portion of the digital waveform; and
    detecting the signal information by comparing portions of the digital waveform with corresponding portions of the reference waveform.

2. The method as set forth in claim 1 wherein the electrical current information is extracted by sampling the current with an analog-to-digital converter.

3. The method as set forth in claim 2 wherein the analog-to-digital converter is operated at a sampling rate of greater than approximately 4000 Hz.

4. The method as set forth in claim 3 wherein the sampling rate is approximately 4320 Hz.

5. The method as set forth in claim 2 wherein the analog-to-digital conversion has approximately fifteen bits of accuracy.

6. The method as set forth in claim 1 wherein the digital filtering is infinite impulse response filtering.

7. The method as set forth in claim 1 wherein the digital filtering is finite impulse response filtering.

8. The method as set forth in claim 1 wherein the digital filtering step includes band pass filtering.

9. The method as set forth in claim 8 wherein the band pass filtering has a pass band with a lower cut-off frequency of approximately 200 Hz.

10. The method as set forth in claim 8 wherein the band pass filtering has a pass band with an upper cut-off frequency of approximately 450 Hz.

11. The method as set forth in claim 8 wherein the band pass filtering is accomplished using a 4-pole Butterworth digital filter.

12. The method as set forth in claim 1 wherein the inbound signals are sent over non-interfering inbound channels of the waveform of the electricity distribution networks, each channel having a detection algorithm associated therewith to distinguish signals on the various channels, including the step, for at least one channel for which signal detection is desired, of applying the detection algorithm for said channel to the filtered digital waveform to extract the signal bit portions of the digitally filtered waveform for said channel.

13. The method as set forth in claim 12 wherein for each channel for which signal detection is desired, the detection algorithm for that channel is applied to the filtered digital waveform.

14. The method as set forth in claim 12 wherein for at least one channel the signal bit portions of the digitally filtered waveform are sampled at a predetermined interval and in a predetermined window.

15. The method as set forth in claim 14 wherein the predetermined interval is approximately five (5) electrical degrees.

16. The method as set forth in claim 14 wherein the predetermined widow is approximately 180 electrical degrees in width.

17. The method as set forth in claim 14 wherein the sampling of the signal bit portions of the digitally filtered waveform begins after a fixed phase delay.

18. The method as set forth in claim 14 wherein the sampling of the signal bit portions of the digitally filtered waveform results in an ordered series of sampled data for each signal bit portion of the digitally filtered waveform.

19. The method as set forth in claim 18 wherein the reference waveform is constructed by mathematically manipulating the ordered series of sampled data for a predetermined number "n" of bits of a message.

20. The method as set forth in claim 19 wherein constructing the reference waveform includes forming composite ordered series from two of the ordered series of sampled data.

21. The method as set forth in claim 20 wherein the composite ordered series is obtained by summing the corresponding elements of the two ordered series of sampled data to form a first preliminary composite ordered series, taking the differences of the corresponding elements of the two ordered series of sampled data to form a second preliminary composite ordered series, summing the elements of the first preliminary composite ordered series, summing the elements of the second preliminary composite ordered series, and selecting as the composite ordered series that preliminary composite ordered series whose sum has the greatest absolute value.

22. The method as set forth in claim 21 wherein the composite ordered series is summed with a third ordered series of sampled data to form a first preliminary replacement composite ordered series, the difference is taken between the elements of the composite ordered series and the third ordered series to form a second preliminary replacement composite ordered series, the elements of the first preliminary replacement composite ordered series being summed, the elements of the second preliminary replacement composite ordered series being summed, and the composite ordered series being replaced by the preliminary replacement composite ordered series whose sum has the greatest absolute value.

23. The method as set forth in claim 22 wherein the steps of claim 22 are repeated for each of the remaining "n−3" ordered series of sampled data so as to incorporate all "n" sets of data in the replacement composite ordered series.

24. The method as set forth in claim 23 wherein the elements of the replacement composite ordered series are normalized to form the reference waveform.

25. The method as set forth in claim 19 wherein the ordered series of sampled data from which the reference waveform is constructed are those corresponding to the first "n" bits of the message.

26. The method as set forth in claim 25 wherein the reference waveform is used to detect all the bits of the inbound message, including those "n" bits used to construct the reference waveform.

27. The method as set forth in claim 25 wherein each bit of the signal information is detected by summing the elements of the reference waveform with the corresponding elements of the ordered series for that bit to form a first signal ordered series, taking the difference of the elements of the reference waveform with the corresponding elements of the ordered series for that bit to form a second signal ordered series, summing the elements of the first signal ordered series, summing the elements of the second signal ordered series, and determining whether the bit under test is a "1" or a "0" by comparing the absolute values of said signal ordered series sums.

28. The method as set forth in claim 1 including the step of checking the bit pattern of the detected signal information and inverting all the elements of said bit pattern when the checking step indicates that the bits of the detected signal as decoded are inverted.

29. The method as set forth in claim 1 further including the step of detecting incorrect bits in the message and the step of correcting said incorrect bits.

30. The method as set forth in claim 29 wherein incorrect bits are detected using the CRC-16 error detection algorithm.

31. The method as set forth in claim 29 wherein the step of correcting said incorrect bits includes determining which bit of the message has the lowest signal strength, and inverting said lowest signal strength bit.

32. The method as set forth in claim 31 including the further step of checking for incorrect bits after inversion of the lowest signal strength bit.

33. The method as set forth in claim 32 wherein if incorrect bits are detected after inversion of the lowest signal strength bit, all possible combinations of the lowest signal strength bit and the next lowest signal strength bit are tried until that combination is found, if any, which causes the message to pass the checking step.

34. The method as set forth in claim 33 wherein the number of bits to be corrected is increased one at a time, with all possible combinations of the bits to be corrected being tested until the message passes the checking step or a predetermined number "j" of bits is reached.

35. The method as set forth in claim 34 wherein "j" is four.

36. The method as set forth in claim 1 further including the step of constructing a second reference waveform from another portion of the digital waveform.

37. The method a set forth in claim 36 wherein both reference waveforms are used to detect signal information.

* * * * *